United States Patent
Bachfischer et al.

(10) Patent No.: US 9,001,049 B2
(45) Date of Patent: Apr. 7, 2015

(54) METHOD FOR DETERMINING THE POSITION OF AN ACTUATION ELEMENT, IN PARTICULAR A FINGER OF A USER IN A MOTOR VEHICLE AND POSITION DETERMINATION DEVICE

(75) Inventors: Katharina Bachfischer, Wolfsburg (DE); Christoph Wäller, Braunschweig (DE); Lennart Bendewald, Wolfsburg (DE); Peter Vikoler, Brixen (IT)

(73) Assignee: Volkswagen AG, Wolfsburg (DE)

( * ) Notice: Subject to any disclaimer, the term of this patent is extended or adjusted under 35 U.S.C. 154(b) by 505 days.

(21) Appl. No.: 12/669,586

(22) PCT Filed: Jul. 10, 2008

(86) PCT No.: PCT/EP2008/006069
§ 371 (c)(1),
(2), (4) Date: Sep. 15, 2010

(87) PCT Pub. No.: WO2009/010308
PCT Pub. Date: Jan. 22, 2009

(65) Prior Publication Data
US 2011/0175843 A1  Jul. 21, 2011

(30) Foreign Application Priority Data

Jul. 19, 2007  (DE) .......................... 10 2007 034 273

(51) Int. Cl.
*G06F 3/041* (2006.01)
*B60K 35/00* (2006.01)
(Continued)

(52) U.S. Cl.
CPC .............. *G06F 3/0418* (2013.01); *B60K 35/00* (2013.01); *B60K 37/06* (2013.01);
(Continued)

(58) Field of Classification Search
CPC ... G06F 3/016; G06F 3/0346; G06F 3/03545; G06F 3/038; G06F 3/044; G06F 3/045; G06F 3/046; G06F 3/0488; G06K 9/00335; B60K 2350/1012

USPC ........... 178/18.01–19.07; 345/173–178, 156, 345/157; 382/103, 104
See application file for complete search history.

(56) References Cited

U.S. PATENT DOCUMENTS 6,204,852 B1  3/2001  Kumar et al. ................. 345/419
6,373,474 B1  4/2002  Katabami ..................... 345/173
(Continued)

FOREIGN PATENT DOCUMENTS

CN  1965290 A   5/2007  ............. G06F 3/033
DE  10242890     3/2004  ............... G06F 3/00
(Continued)

OTHER PUBLICATIONS

International PCT Search Report, PCT/EP2008/006069, 18 pages, Mailed Nov. 17, 2008.
(Continued)

*Primary Examiner* — Amr Awad
*Assistant Examiner* — Aaron Midkiff
(74) *Attorney, Agent, or Firm* — King & Spalding L.L.P.

(57) ABSTRACT

A method for determining the position of an actuation element, e.g. a finger of a user, in a motor vehicle when the element approaches a surface and to a position determination device, has the following steps: generating an HF signal; coupling the HF signal into the user; transmitting the HF signal via the body of the user; receiving the HF signal that has been transmitted via the body and the actuation element, using several sensors and determining the position of the actuation element using sensor signals of the sensors, the sensor signals forming a measurement for the received signal intensity of the HF signal and are used to first calculate the position of the centre of gravity of the approaching object, in particular the approaching body part comprising the actuation element, and the position of the actuation element is calculated, taking into consideration the position of the centre of gravity.

22 Claims, 2 Drawing Sheets

(51) Int. Cl.
  *B60K 37/06* (2006.01)
  *G06F 3/044* (2006.01)
(52) U.S. Cl.
  CPC ............ *B60K 2350/1012* (2013.01); *B60K 2350/1024* (2013.01); *B60K 2350/1028* (2013.01); *G06F 3/041* (2013.01); *G06F 3/044* (2013.01)

(56) References Cited

U.S. PATENT DOCUMENTS

| | | | | |
|---|---|---|---|---|
| 6,417,841 | B1 * | 7/2002 | Doi et al. | 345/158 |
| 6,819,782 | B1 | 11/2004 | Imagawa et al. | 382/115 |
| 7,038,659 | B2 * | 5/2006 | Rajkowski | 345/156 |
| 7,091,886 | B2 | 8/2006 | DePue et al. | 341/33 |
| 7,432,917 | B2 * | 10/2008 | Wilson et al. | 345/175 |
| 2005/0041018 | A1 | 2/2005 | Philipp | 345/178 |
| 2005/0063564 | A1 | 3/2005 | Yamamoto et al. | 382/104 |
| 2006/0192690 | A1 | 8/2006 | Philipp | 341/33 |
| 2006/0261672 | A1 | 11/2006 | Richter | 307/10 |

FOREIGN PATENT DOCUMENTS

| | | | |
|---|---|---|---|
| DE | 10321964 | 12/2004 | B60J 7/057 |
| DE | 102005048840 | 4/2007 | B60H 1/00 |
| EP | 1335318 | 8/2003 | G06K 11/16 |
| WO | 2004/022388 | 3/2004 | B60R 16/02 |
| WO | 2004/078536 | 9/2004 | B60R 25/00 |
| WO | 2005/121938 | 12/2005 | G06F 3/033 |
| WO | 2005/121938 A2 | 12/2005 | G06F 3/033 |
| WO | 2006/119546 | 11/2006 | A61B 5/029 |

OTHER PUBLICATIONS

International Preliminary Report on Patentability, PCT/EP2008/006069, 15 pages, Mailed Feb. 18, 2010.

* cited by examiner

METHOD FOR DETERMINING THE POSITION OF AN ACTUATION ELEMENT, IN PARTICULAR A FINGER OF A USER IN A MOTOR VEHICLE AND POSITION DETERMINATION DEVICE

CROSS-REFERENCE TO RELATED APPLICATIONS

This application is a U.S. National Stage Application of International Application No. PCT/EP2008/006069 filed Jul. 10, 2008, which designates the United States of America, and claims priority to German Application No. 10 2007 034 273.1 filed Jul. 19, 2007, the contents of which are hereby incorporated by reference in their entirety.

TECHNICAL FIELD

The invention relates to a method for determining the position of an actuation element, in particular a finger of a user in a motor vehicle during an approach towards a surface as well as to a position determination device.

BACKGROUND

It is known in the art to detect the position of an actuation element, for example a finger of a user contactless. For this it is provided for that a high frequency sensor signal is generated by means of a signaling device. This signal is capacitive coupled into a user sitting on a seat of the vehicle. The device of the signal sensor therefore preferably is provided at the seat of the vehicle. In order to detect an approach of a finger of the user towards a surface sensors are arranged at or surrounding the surface. When the finger approaches these sensors, then a capacity changes in the signal circuit comprising the signaling device, the user and the sensors, which in turn are connected and coupled, respectively, to the signaling device via the vehicle. The change in the capacity, which may be considered as a change in a received signal strength of the sensor signal transmitted via the body of the user, is a measure for a distance of the finger of the user to the respective sensor. Other sensor systems may be designed following other principles, however, in each case a signal strength of the HF signal transmitted via the user is evaluated. By means of the known positions of the sensors and the separate sensor signals, which in each case indicate a measure for a distance of the body part to the respective sensor, the position of the body part may be determined by means of a triangulation.

The basic principles of such a HF signal transmission via the body of a user in a motor vehicle for contactless detecting an approach of a body part are described in WO 2004/078536.

Position determination units are often used in motor vehicles in connection with display and control devices which are arranged in a center console between a driver's seat and a co-driver's seat. In particular, the position determination units are used together with such display and control devices which comprise a display surface. The position determination unit is then used in order to determine an approach of a finger of a user relative to the display surface. Because of the device being arranged between the driver's seat and the co-driver's seat an approach of the finger, however, as a general rule does not occur perpendicular with respect to the display surface. Rather, the approach in most cases occurs in an inclined angle. Since the sensors are arranged surrounding the display surface or spaced therefrom not always the finger is the body part which is proximate closest to one of the sensors.

Shown in FIGS. 1a to 1d are four situations in which a user in each case approaches his right index finger 1 towards different contact positions 2 to 5 of a display surface 6 designed as a touch-screen and arranged to the right of the user. Arranged surrounding the display surface 6 are sensors 8 to 11 at respective corner positions 7. During the contact situation of FIG. 1a in which the user touches the contact position 2 located in the left lower corner using the right index finger 1 none of the sensors 8 to 11 is affected interferingly by another body part in a noteworthy manner.

During an approach of the right index finger 1 to the contact position 3 located in the left upper corner of the display surface 6, however, the sensor 8 arranged at the left lower corner is additionally affected by a hand 12 and a forearm 13 of the user.

During the situation of FIG. 1c in which the user approaches the right index finger 1 to the contact position 4 arranged in the right upper corner the sensor 8 arranged in the left lower corner is strongly affected by the hand 12 and the forearm 13.

During the situation depicted in FIG. 1d in which the right index finger 1 of the user is approaching the contact position 5 located in the lower right corner the sensors 8 and 11 respectively arranged at the left lower corner and the right lower corner are also affected by the hand 12 and the forearm 13. Therefore, a triangulation carried out by means of the sensor signals often does not result in an accurate position determination of the right index finger 1 used to make contact.

SUMMARY

Therefore, the technical problem exists that the position determination is not solved satisfactory according to the art. According to various embodiments, an improved position determination device and an improved method for determining the position of an actuation element, in particular a finger of a user in a motor vehicle during an approach towards a surface can be established.

According to an embodiment, a method for determining the position of an actuation element, in particular of a finger of a user in a motor vehicle during an approach to a surface, may comprise the following steps: detecting sensor signals of contactless measuring sensors, wherein the sensor signals are a measure for a distance of an object, in particular of a body part of the user, to a respective sensor position, and determining the position of the actuation element, in particular of the finger, by means of the sensor signals of the sensors, wherein by means of the sensor signals at first a position of the center of gravity of the object, in particular of the body part, approaching together with the actuation element, in particular the finger, is determined and in consideration of the position of the center of gravity the position of the actuation element, in particular of the finger, is calculated.

According to a further embodiment, the detecting of the sensor signals may comprise the following steps: generating a HF signal; coupling the HF signal into the user; transmitting the HF signal via the body of the user; and receiving the HF signal transmitted via the body and the actuation element, in particular the finger of the user by means of several sensors, wherein in each case the sensor signals are a measure for the received signal strength of the HF signal. According to a further embodiment, the position of the actuation element, in particular of the finger, can be determined based on the position of the center of gravity in consideration of an offset dependent on the position of the center of gravity. According to a further embodiment, the space in front of the surface can be sub-divided into sub-spaces and to each sub-space an offset can be allocated. According to a further embodiment, the offset can be calculated by means of a function of the position of the center of gravity. According to a further embodiment, allocations of the received signal strengths to the determined distances of the actuation element, in particular of the finger, to the respective sensors for the calculation of the position of the actuation element, in particular the position of the finger, in each case can be individually adapted depending on the determined position of the center of gravity. According to a further embodiment, in addition at least one position of the center of gravity determined beforehand during the approach can be included in the determination of the position of the actuation elements, in particular the positions of the fingers. According to a further embodiment, the surface can be a touch-screen and by means of the touch-screen at a contact of the touch-screen by the actuation element, in particular the finger, a contact position is determined and provided, and the contact position is compared to the determined position of the actuation element, in particular the finger, and the offset and/or the allocation of the signal strengths to the distances are corrected by means of a deviation. According to a further embodiment, the offset and/or the allocations can be stored in a personalized manner. According to a further embodiment, in addition a further HF signal can be generated which is coupled into a further user and the sensors or the further sensors provide further sensor signals which provide a measure for a received signal strength of the further HF signal transmitted via the further body and a further actuation element, in particular a further finger of the further user, and wherein by means of the further sensor signals at first a further position of the center of gravity of the further object, in particular the further body part, approaching together with the further actuation element, in particular the further finger, is determined and the further position of the actuation element, in particular the further position of the finger, is determined in consideration of the further position of the center of gravity.

According to another embodiment, a position determination device of a motor vehicle for determining the position of an actuation element, in particular of a finger of a user in three-dimensional space during an approach towards a surface, may comprise contactless measuring sensors generating sensor signals which are a measure for a distance of an object, in particular of a body part, of the user to a respective sensor position, and an analyzing and control unit which calculates a position of the actuation element, in particular of the finger, relative to the display surface by means of the sensor signals of the sensors, wherein the analyzing and control unit comprises a position of center of gravity determination module by which by means of the sensor signals at first a position of the center of gravity of the object, in particular the body part, approaching together with the actuation element, in particular the finger, is detectable, and an actuation element position calculation module by which the position of the actuation element, in particular of the finger, is ascertainable in consideration of the position of the center of gravity.

According to a further embodiment, the actuation element position calculation module can be designed to detect the position of the actuation element, in particular of the finger, based on the position of the center of gravity in consideration of an offset dependent on the position of the center of gravity. According to a further embodiment, the space in front of the surface can be sub-divided in sub-spaces and an offset can be allocated to each sub-space, wherein the offsets are stored in a memory and are readable from the memory depending on in which sub-space the position of the center of gravity is located. According to a further embodiment, the actuation element position calculation module may comprise an offset calculation module which determines the offset by means of a function of the position of the center of gravity. According to a further embodiment, the actuation element position calculation module may comprise an allocation module by means of which allocations of the received signal strengths to determined distances of the actuation element, in particular the finger, to the respective sensor in each case are individually adaptable for the calculation of the position of the actuation element, in particular the position of the finger, depending on the determined position of the center of gravity. According to a further embodiment, in addition at least one position of the center of gravity determined beforehand during the approach can be includible in the determination of the position of the actuation elements, in particular the positions of the fingers. According to a further embodiment, the surface can be a touch-screen and the analyzing and control unit can be designed to receive a contact position determined and provided by means of the touch-screen at a contact of the touch-screen by the actuation element, in particular the finger, and comprises a comparison module for determining a deviation of the contact position of the determined position of the actuation element, in particular of the finger, and a correction module to correct the offset and/or the allocation of the signal strengths to the distances. According to a further embodiment, an identification module can be provided which can detect identification information of the user and stores in a memory in a personalized manner the offset and/or the allocations or reads these therefrom. According to a further embodiment, a signaling device can be provided for generating a high frequency sensor signal, wherein the signaling device is arranged to couple the sensor signal capacitive or conductively into a body of the user; and the several sensors are designed to receive in a capacitive manner the sensor signal coupled into the body and transmitted via this body and the actuation element, in particular the finger, wherein the sensor signals of the sensors are a measure for the received signal strength. According to a further embodiment, a further signaling device for generating a further HF signal can be arranged such that the further HF Signal may be coupled into a further user and the sensors or further sensors can be designed to provide further sensor signals which provide a measure for a received signal strength of the further HF signal transmitted via the further body and a further actuation element, in particular a further finger, of the further user, and wherein by means of the further sensor signals at first a further position of the center of gravity of the further object, in particular a further body part, approaching together with the further actuation element, in particular the further finger, is detectable and the further position of the actuation element, in particular the further position of the finger, is detectable in consideration of the further position of the center of gravity.

BRIEF DESCRIPTION OF THE DRAWINGS

In the following the invention is described in more detail by means of exemplary embodiments. In this connection.

DETAILED DESCRIPTION

Figure 1A:
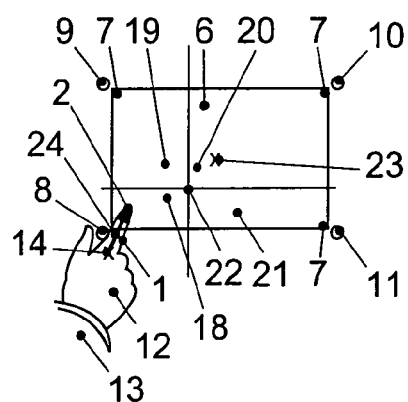
FIGS. 1a to 1d show different approach situations of a right index finger towards a display surface in which the sensors of the position determination unit are arranged adjacent to the corners of the display surface.
Figure 1B:
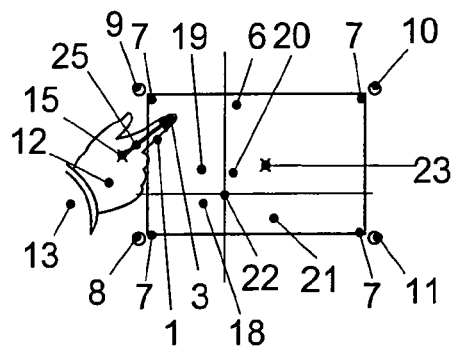
Figure 1C:
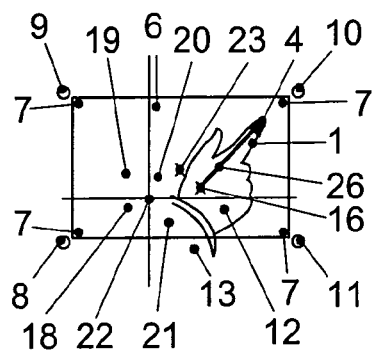
Figure 1D:
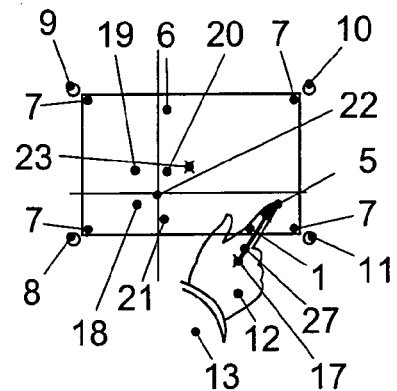

According to various embodiments, by means of the sensor signals, which are a measure for a distance of the sensor to an object, for example a body part, in a first step merely a position of the center of gravity of the object (for example of the body part), which is approaching this surface, is determined. This position of the center of gravity deviates from the position of the actuation element, for example the position of the finger. The deviation between the position of the center of gravity and the position of the actuation element (for example the position of the finger) in turn depends on the position of the center of gravity determined. This is based on the fact that the object posture or hand posture on the one hand changes depending on the position of the center of gravity and on the other hand is based on the fact that the parts of the object (of the body) considered during the determination of the position of the center of gravity are differing. For example, in the approach situation depicted in FIG. 1c a larger portion of the forearm is considered in a determination of the position of the center of gravity than in the situation of FIG. 1b or 1d. Besides a finger or another body part also objects handled by the user which are fixedly connected to the body have to be considered as actuation elements. In particular it is feasible that the user wears pieces of clothing, for example gloves. Likewise, the user may hold an element, for example a pen or a stick in one hand. In this connection it is to be acted on the assumption that the user holds such a pen or a stick similar in each case when he uses it as an actuation element. In such a case not only the body part itself but the body part in connection with the actuation element is to be considered as the object. The object therefore always comprises a body part and, should the situation arise, in addition an "exogenous" actuation element instead of an "endogenous" actuation element. According to various embodiments, therefore a method is proposed which comprises the following steps: detecting sensor signals of contactless measuring sensors, wherein the sensor signals are a measure for a distance of an object, in particular of a body part of the user, to a respective sensor position and determining the position of the actuation element (finger) by means of sensor signals of the sensors, wherein by means of the sensor signals at first a position of the center of gravity of the object (body part) approaching together with the actuation element (finger) is determined, and in consideration of the position of the center of gravity the position of the actuation element (finger) is calculated. It is an advantage of this method that the position of the actuation element (finger) may be determined considerably more precise. Thereby, the position of the actuation element (finger) determined more precisely may be used to control a user interface displayed on the display surface. For example, a contact position may be better anticipated during the approach. Thus, for example, the control elements in the area of the anticipated contact position used for an initiation by a contact may be displayed enlarged in order to increase a success probability of the user. A more precisely known position of the actuation element (finger) also may be used in a different manner for advantageously controlling a user interface. For example, a displacement of elements, an enlarging and/or minimizing and so forth may be formed dependent on the respective position of the actuation element (the respective position of the finger). In addition, different actions may be initiated depending on the determined position of the actuation element (finger).

In an embodiment it is provided for that the detection of the sensor signals comprises the following steps: generating a HF signal; coupling the HF signal into the user; transmitting the HF signal via the body of the user; receiving the HF signal transmitted via the body and the actuation element (the finger) of the user by means of the several sensors, wherein the sensor signals in each case are a measure for the received signal strength of the HF signal. However, also other sensors may be used which for example detect a capacitive change in an area in front of a display. Such "sensors" may for example be formed by transparent conductor paths which are arranged preferably interlaced in front of a display device designed as a touch-screen. Such a device comprises a plurality of "sensors" providing sensor signals. Other sensors measuring contactless operate based on ultrasound or use optical methods. Such sensors operating according to an optical method may for example each be formed according to the following principle: A sending LED emits a rectangular amplitude modulated light signal in an optical or infrared wavelength range. The light signal reflected at an object is detected by a photodiode. Via an invariable light path a reference light signal also rectangular amplitude modulated is sent phase shifted by 180° from a compensation LED to the photodiode. The compensation LED is regulated via a control circuit by means of a control signal such that the received reflected light signal of the sending LED and the received reference light signal of the compensation LED compensate each other at the photodiode and a DC signal is detected. A change in the control signal is a measure for the distance of the object. A sensor unit formed according to this principle is largely independent of fluctuations in temperature and brightness.

A particularly simple determination of the position of the actuation element (the position of the finger) based on the position of the center of gravity is feasible using a method in which the position of the actuation element (finger) based on the position of the center of gravity is determined in consideration of an offset dependent on the position of the center of gravity. As already mentioned above a deviation of the actual position of the actuation element (the actual position of the finger) is dependent on an object posture (hand posture) as well as on the strength of the influence on the separate sensors by the hand and a forearm and so forth, i.e. a form of the object. An offset between the position of the center of gravity and the position of the actuation element (position of the finger) therefore varies depending on the position of the center of gravity. By considering the variable offset dependent on the position of the center of gravity the accurate position of the actuation element (the accurate position of the finger) may be achieved therefore.

In a further embodiment it is provided for that the space in front of the surface, for example a display surface, is subdivided into sub-spaces and to each sub-space an offset is allocated. Thereby, in a simple manner it may be considered that the hand posture in general is dependent on the aspired contact position and the current position of the actuation element (finger), respectively. For example, the farther the contact position is laterally away from the driver the more his palm approaches a parallel arrangement with respect to the surface to be considered. This is to mean that by means of the position of the center of gravity determined the hand posture may be deduced. Likewise this allows detecting an offset between the position of the center of gravity and the position of the actuation element (position of the finger). Thereby, in a simple manner the position determination is made more precise. A change in the hand posture also occurs when the user holds and guides a pen or a stick in the hand as an actuation element. The separate offsets allocated to the sub-spaces may for example be stored in a table. A determination of the position of the actuation element (position of the finger) therefore merely makes necessary a recalling of the respective offset value and an addition of this offset value to the position of the center of gravity in order to determine the position of the actuation element (position of the finger).

In a further embodiment it is provided for that the offset is a function of the position of the center of gravity. In this embodiment the offset is parameterized in dependence on the position of the center of gravity and stored as a function. Such a function may for example be determined by means of an interpolation between different particular offsets for differing positions of the center of gravity.

Another approach for a determination of the position of the actuation element (position of the finger) is based on the assumption that the distances allocated to the signal strengths may be adapted depending on the position of the center of gravity determined. This is equivalent to an adaptation of the characteristic curves of the individual sensors. An embodiment therefore proposes that allocations of the received signal strengths to determined distances of the actuation element (finger) to the respective sensors for the calculation of the position of the finger in each case are adapted individually depending on the determined position of the center of gravity. This method therefore allows for a second precise triangulation in which the position of the center of gravity is used for attenuating (when indicated also for amplifying) individual sensor signals.

It is feasible to further improve the determination of the position of the actuation element (position of the finger) using an embodiment in which in addition at least one position of the center of gravity determined beforehand during the approach is included in the determination of the position of the actuation element (position of the finger). By means of the consideration of several determined positions of the center of gravity a direction of movement may be detected. In particular, in embodiments in which an allocation of the received signal strength to a distance is adapted depending on the determined position of the center of gravity knowledge of a direction of approach is an advantage. Characteristic allocation curves for differing directions of approach may be experimentally detected and stored for the individual sensors. By means of these allocations a very precise position determination for the finger may then be conducted. When using linear characteristic curves this may lead to an adaptation of the incline of the characteristic curves depending on the direction of approach.

In an embodiment the surface towards which the actuation element (the finger) is approaching is a touch-screen and by means of the touch-screen a contact position is determined and provided at a contacting of the touch-screen by the actuation element (the finger). The contact position is compared to the determined position of the actuation element (finger) and by means of a deviation the offset and/or the allocations of the signal strengths in relation to the distances (i.e. the characteristic curves of the sensors) are corrected. Thereby, in particular an adaptation to an individual user in a motor vehicle is allowed for. In particular, also in such cases where an "exogenous" actuation element is used. In the case of a delivery of the vehicle in a brand new condition as offsets and allocations used are those that provide acceptable position determinations for a plurality of users. However, users who prefer a sitting position deviating from the conventional sitting position, have a particularly small or particularly large hand and/or approach their hand and their finger or another actuation element in curved paths towards the surface which strongly deviate from the commonly used curved paths, may also achieve very precise positions of the determinations of the actuation elements (determinations of the positions of the finger) using the further embodiment. Step by step the position determination device and the method for determining the position of the actuation element (finger), respectively, is optimized and personalized this way.

Therefore, as a further embodiment it is provided for that the offset and/or the allocations may be stored in a personalized manner. Provided that identification information of the user may be acquired, therefore the offset and/or the allocations may be stored in a memory and read therefrom in a personalized manner.

According to a further embodiment, the user and a further user, for example a driver and a co-driver, may be discriminated by the position determination unit. A further embodiment therefore provides for that a position determination device comprises a further signaling device for generating a further HF signal which is arranged such that the further HF signal may be coupled into a further user and that the sensors or further sensors are designed to provide further sensor signals which indicate a measure for a received signal strength of the HF signal transmitted via the further body and a further actuation element (a further finger) of the further user and wherein by means of the further sensor signals at first a further position of the center of gravity of the further object (body part) approaching together with the further actuation element (finger) is detectable and the further position of the actuation element (position of the finger) is detectable in consideration of the further position of the center of gravity. For the further user the offsets and the allocations, respectively, corresponding to the different position from which the further user approaches the surface, are correspondingly different to those of the user. For example, if the user approaches from the left side using his left index finger, this in general corresponds to a mirroring at a center line between the user and the further user. However, if the user as a right handed person for example approaches a surface located to the left of him also using his right index finger, then generally different offsets have to be considered.

The characteristics of the position determination device according to various embodiments have the same advantages as the respective characteristics of the method.

As already described above, depicted in FIGS. 1a to 1d are four situations in which the right index finger 1 serving as the actuation element approaches different contact positions 2 to 5 on the display surface 6. In the following in each case an index finger is considered as the actuation element. However, also a different finger or a hand-held and/or hand-guided pen, stick or the like could be used as the actuation element. Since the hand 12 and the forearm 13 interferingly affect the individual sensors 8 to 11 in the different situations differently, not the accurate positions of the right index finger 1 are determined by the position determination unit by means of the sensor signals, but rather positions of the center of gravity 14 to 17 in each case. As very well can be seen, the "location" of the position of the center of gravity varies relatively with respect to the body part (the hand 12, the forearm 13) which approaches the display surface 6 together with the right index finger 1. This means that a position of the right index finger 1 in each case is offset differently with respect to the determined position of the center of gravity 14 to 17. According to an embodiment it is therefore provided for to sub-divide the spatial area in front of the display surface into sub-spaces 18 to 21. This division into the four sub-spaces 18 to 21 is only exemplary of course. Since an approach in the example depicted is carried out from the lower left to the upper right a contacting point 22 of all four sub-spaces is shifted to the lower left with respect to a center point 23 of the display surface 6 and an arrangement of the sensors 8 to 11, respectively. Depending on in which of the sub-spaces 18 to 21 the position of the center of gravity 14 to 17 is located a different offset 24 to 27 has to be added to the positions of the centers of gravity 14 to 17 in order to achieve the position of the finger which in each case corresponds to the respective contact position 2 to 5 of this depiction. The different offsets 24 to 27 which are allocated to the sub-spaces 18 to 21 correspondingly may for example be stored in a memory and may be recalled therefrom depending on the determined position of the center of gravity 14 to 17.

It unfolds for a person skilled in the art that a division of the space in front of the surface, i.e. the display surface 6, may be adaptively sub-divided corresponding to the actually occurring approach situations. Of course, more sub-spaces or also fewer sub-spaces may be used. In the example depicted the sub-space is merely divided into four sub-spaces 18 to 21. Of course, also a division of the space perpendicular to the display surface 6 is reasonable in order to adequately take into account the differently strong influence of the individual sensors 8 to 11 depending on the distance of the body parts approaching. This means that not only the lateral position of the right index finger, of the hand 12 and of the forearm 13 are of importance but also their perpendicular distance to the display surface 6.

In an alternative embodiment it is feasible to establish an offset function which is dependent on the position of the center of gravity.

This is more or less equivalent to a very continuous division, i.e. very fine division of the space virtually into sub-points.

It is particularly advantageous when a contact position, which is provided by a display surface designed as a touch-screen, is compared to the determined position of the finger in order to correct the individual offsets. Thereby it is feasible to adapt and preferably store the offsets necessary for the individual sub-ranges and determined positions, respectively, of the center of gravity in a personalized manner. If the position determination system may detect a personal identification which is stored in a personalized vehicle key for example, then the individual offset data may be stored in a personalized manner. Therefore, different sets of offsets may be stored in the vehicle for the individual persons who for example own a vehicle key personalized by means of an identification number and use it when operating the vehicle.

Figure 2:
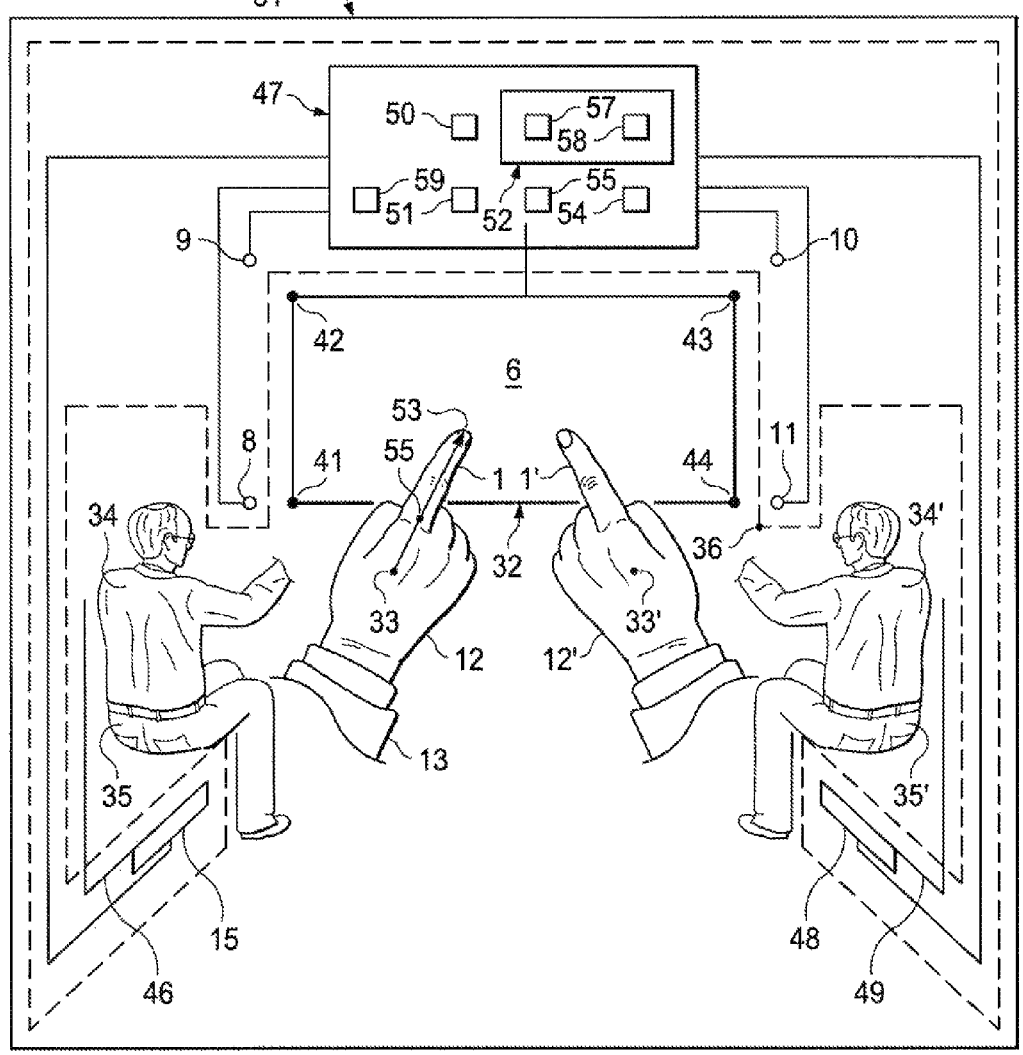
FIG. 2 shows a schematic depiction of a motor vehicle together with a position determination unit arranged adjacent to a display surface.

In FIG. 2 an interior space of a motor vehicle 31 is depicted schematically. In a center console a control element 32 designed as a touch-screen is arranged. On a freely programmable display surface 6 on the one hand information for a user 34 may be outputted. On the other hand so called virtual control elements may be displayed on the freely programmable display surface 6 which the user 34 may initiate and/or operate via a contact by means of an actuation element, here a right index finger 1. The actuation element will be a finger of the user as a general rule. In order to detect a position of the finger 1 in a space in front of the control element 32, i.e. a monitored volume in front of the display surface 6, a contact-less measuring position determination device 36 is provided. The position determination device 36 comprises sensors 8 to 11 which are arranged adjacent to corners 41 to 44 of the display surface 6. These sensors 8 to 11 receive a high frequency signal which is transmitted via the user 34 and his actuation element, the index finger 1, and is coupled into the sensors 8 to 11 in a capacitive manner. The high frequency signal transmitted, which is called sensor signal, is generated by a signaling device 45 which is integrated into a driver seat 46. The sensor signal generated and comprising a sending level is coupled into the user 34 sitting on the driver seat 46 in a capacitive manner, transmitted via the body 35 of the user 34 and his forearm 13, hand 12 and index finger 1 and coupled into the sensors 8 to 11 in a capacitive manner. The sensors in each case provide a sensor signal which comprises information about a received signal strength. The individual sensors 8 to 11 are connected to an analyzing and control unit 47 which by means of the sensor signals determines a position of the index finger 1 in the space in front of the display surface 6. In this connection it is utilized that the received signal strengths in each case are a measure of the distance of the index finger 1 to the respective sensor 8 to 11. The position of the finger 1 is determined by at first determining via a triangulation a position of the center of gravity of the body parts approaching together with the finger 1 (the hand 12 and the forearm 13). For this, the analyzing and control unit 47 comprises a center of gravity position determination module 50.

In a memory 51 offsets corresponding to individual sub-spaces are stored. An actuation element position module 52 which also is called a finger position calculation module determines the sub-space in which the position of the center of gravity 33 is located. The offset 55 corresponding to this sub-space is recalled or read from the memory 51 and added to the position of the center of gravity 33 to achieve the position of the finger 53. It shall be understood that as a general rule the offset is representable by means of a three-dimensional vector.

When the finger 1 contacts the display surface 6 and if the display surface 6 is designed as a touch-screen, then it provides a contact position information. A comparison module 54 determines an existing deviation of the contact position from the determined position of the finger, when indicated. If a deviation exists, then the offset 55 is adapted accordingly by means of a correction module 56. It may be provided for that the offset 55 only is corrected if a deviation is existent above a predetermined threshold.

In order to also be able to detect a further actuation element, a further finger 1' of a further user 34', for example of a co-driver the position determination device 36 of the depicted embodiment comprises a further signaling device 48 which is integrated into the co-driver's seat 49. The further signaling device 48 preferably generates a high frequency signal which has a different frequency or represents a high frequency signal which is differently modulated as compared to the sensor signal. By means of the further sensor signal a position of the center of gravity 33' of the hand 12' may be determined, and the position of the finger 1' may be determined in consideration of the position of the center of gravity 33', in a manner similar to that discussed with regard to the driver 34.

The signaling device 45 and the further signaling device 48 may also be arranged at different locations in the motor vehicle. However, a capacitive coupling of the sensor signal and the further sensor signal, respectively, is feasible particularly straightforward by introducing conductive mats into the seating area, for example.

For the further user other offsets are used which as a general rule are allocated to other sub-spaces. Apart from that, the determination of the further finger position of the further finger may be carried out analogous.

In another embodiment it is provided for that the actuation element position calculation module calculates the position of the finger by means of an offset dependent on the position of the center of gravity 33, which offset on his part is calculated by means of an offset calculation module 57 using a function of the position of the center of gravity 33. Thereby it is feasible to carry out a very fine division of the space, virtually into sub-points.

The function may be parameterized by means of interpolated offsets which are deduced from individual measured positions of the center of gravity and positions of the fingers.

Also, it is feasible to form individual parameters of the function in an adaptable manner so that detected deviations between the contact position and the determined position of the finger may be used for adapting the function for calculating the offset.

In yet another embodiment it is provided for that the actuation element position calculation module is designed to determine the position of the finger by means of a triangulation, wherein, however, by means of an allocation module 58 an allocation of a received signal strength to a distance for each of the sensors is adapted depending on the determined position of the center of gravity or even depending on a direction of approach. The direction of approach of the finger may be deduced in consideration of at least one previously determined position of the center of gravity. Likewise it is feasible to detect the direction of approach by means of positions of the fingers determined beforehand. Generally, the direction of approach may be determined by means of positions determined beforehand. An adaptation of the allocation of received signal strength to distance corresponds to an adaptation of the characteristic curve of a sensor. If this characteristic curve is linear, then a change of the allocation may consist in an adaptation of the linear slope, for example. For example, for different directions of approach different characteristic curves may be detected and stored in the memory. If these characteristic curves (allocations of received signal strength to distance) may be parameterized, then they may be stored in the form of formula. Apart from that it is feasible to store the characteristic curves in the form of tables, wherein in many cases merely individual pairs of values of received signal strength—distance have to be stored. As a general rule the intermediate values may be interpolated. The actuation element position calculation module calculates the position of the finger by means of the individually adapted allocations from the sensor signals using a triangulation.

Also, in this embodiment deviations between the measured contact position and the determined position of the finger may be use to adapt the allocations in this case.

The information necessary for the calculation of the finger position in each case may be stored in the memory corresponding to the user provided that an identification module 59 of the position determination unit may identify the user, for example by means of an identification number coded in a vehicle key which is transmitted to the position determination unit.

It shall be understood by a person skilled in the art that the individual modules of the analyzing and control unit described may be implemented in software as well as in hardware or in a combination therefrom. In particular, the analyzing and control unit may comprise a computing unit which may execute a program code stored in the memory. The individual modules may then be implemented as program code modules. It further arises that an exact delineation of the functionality of the individual modules is not feasible in many cases and that these may be combined partially or as a whole.

The different elements of the position determination unit may be arranged in a distributed manner in the motor vehicle. Also, they may be integrated into one or several components. In particular, the analyzing and control unit may be integrated into a central control device and/or a multi-function operating device in which the above mentioned display surface is integrated as well.

Figure 3A:
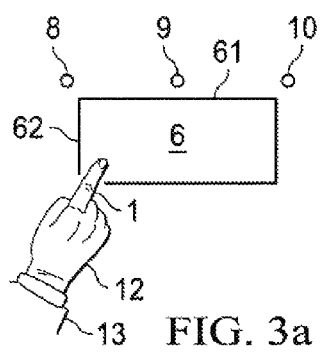
FIGS. 3a to 3c show different situations of the approach of a right index finger towards an elongated display surface, wherein the sensors of the position determination unit are arranged above the display surface.
Figure 3B:
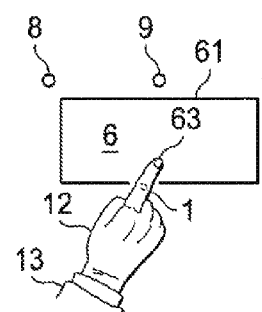
Figure 3C:
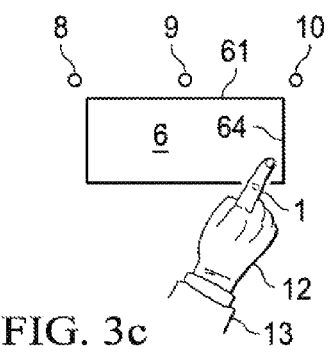

Depicted in FIGS. 3a to 3c are further situations in which an index finger 1 is approximated towards an elongated display surface 6. In this case sensors 8 to 10 are arranged along an upper edge 61 of the display surface 6. In the situation (see FIG. 3a) in which the index finger approaches a position at the left edge 62 of the display surface 6 none of the sensors 8 to 10 is subject to a noteworthy interference by the hand 12 or the forearm 13. Depicted in FIG. 3b is the situation in which the finger 1 approaches a contact position 63 in a center of the display surface 6. In this situation the sensor 8 arranged at the upper left corner of the display surface 6 is also affected by the hand 12 and the forearm 13 so that a determined position of the center of gravity deviates from the actual position of the finger. In the situation according to FIG. 3c in which the index finger 1 approaches a right edge 64 of the display surface 6 the sensors 8 and 9 arranged at the upper left corner and centrally above the upper edge 61 of the display surface 6, respectively, are also affected by the hand 12 and the forearm 13 so that a determined center of gravity considerably deviates from the position of the finger. Depending on the position of the center of gravity determined a respective corresponding offset may be used to calculate the accurate position of the finger as described above. Alternatively, the characteristic curves, i.e. the allocations of the received signal strength to a respective distance, may be adapted to detect the position of the finger directly by means of a triangulation method.

The embodiments shown use sensors which detect HF signals transmitted via the human body, however, also any other sensors may be used which may contactless detect the approach of an object towards a surface and thereby generate a sensor signal which is a measure for the distance of the object to the sensor. In particular, the above mentioned sensors may be used.

REFERENCE NUMERALS 1 index finger
2-5 contact positions
6 display surface
7 corners
8-11 sensors
12 hand
13 forearm
14-17 positions of the centers of gravity
18-21 sub-spaces
22 contacting point of the sub-spaces
23 center of the display surface
24-27 offsets
31 motor vehicle
32 control element
33 position of the center of gravity
34 user
35 body
36 position determination device
45 signaling device
46 driver's seat
47 analyzing and control unit
48 further signaling device
49 co-driver's seat
50 position of center of gravity determination module
51 memory
52 actuation element position calculation module
53 position of the finger
54 comparison module 55 offset
56 correction module
57 offset calculation module
58 allocation module
59 identification module
61 upper edge
62 left edge
63 position of contact
64 right edge

What is claimed is:

1. A method for determining a position of an actuation element in a motor vehicle during an approach to a surface, the method comprising:
    detecting sensor signals of contactless measuring sensors, wherein the sensor signals indicate a distance of an object relative to a respective sensor position,
    determining a current position of a center of gravity of the object together with the actuation element based on the detected sensor signals,
    determining an offset vector based on the determined current position of the center of gravity and independent of the current actual position of the actuation element with respect to the current position of the center of gravity, the offset vector representing an estimated instantaneous difference in position between the current position of the center of gravity the current actual position of the actuation element, and
    calculating the current position of the actuation element based on the determined current position of the center of gravity and using the determined offset vector.

2. The method according to claim 1, wherein the detecting of the sensor signals comprises the following steps:
    generating a high frequency (HF) signal;
    coupling the HF signal into a user;
    transmitting the HF signal via a body of the user;
    receiving the HF signal transmitted via the body and the actuation element of the user by means of several sensors,
    wherein in each case the sensor signals are a measure for received signal strength of the RF signal.

3. The method according to claim 1, wherein:
    a space in front of the surface is sub-divided into sub-spaces,
    each sub-space is assigned a sub-space-specific offset vector, and
    determining the offset vector based on the determined current position of the center of gravity comprises selecting the sub-space-specific offset vector of the sub-space corresponding to the determined current position of the center of gravity.

4. The method according to claim 1, wherein allocations of received signal strengths to the determined distances of the actuation element to the respective sensors for the calculation of the current position of the actuation element in each case are individually adapted depending on the determined current position of the center of gravity.

5. The method according to claim 1, wherein in addition at least one position of the center of gravity determined beforehand during the approach is included in the determination of the current position of the actuation elements.

6. The method according to claim 1, wherein the surface is a touch-screen and by means of the touch-screen at a contact of the touch-screen by the actuation element a contact position is determined and provided, and the contact position is compared to the determined current position of the actuation element and at least one of the offset and allocations of the signal strengths to the distances are corrected by means of a deviation.

7. The method according to claim 6, wherein at least one of the offset and the allocations are stored in a personalized manner.

8. The method according to claim 1, wherein in addition a further high frequency (HF) signal is generated which is coupled into a further user and the sensors or further sensors provide further sensor signals which provide a measure for a received signal strength of a further HF signal transmitted via a further body and a further actuation element and wherein by means of the further sensor signals a further current position of the center of gravity of the further object approaching together with the further actuation element is determined and the further current position of the actuation element is determined in consideration of the current further position of the center of gravity.

9. The method according to claim 1, wherein the actuation element is a finger of a user.

10. The method according to claim 1, wherein the object is a body part of a user.

11. The method according to claim 1, wherein calculating the current position of the actuation element based on the determined current position of the center of gravity and using the determined offset vector comprises adding the offset vector to a value corresponding to the current center of gravity.

12. A position determination device of a motor vehicle for determining a position of an actuation element of a user in three-dimensional space during an approach towards a surface, the position determination device comprising:
    contactless measuring sensors configured to generate sensor signals indicating a measure for a distance of an object of the user with respect to a respective sensor position, and
    an analyzing and control unit configured to calculate a position of the actuation element relative to the display surface by means of the sensor signals of the sensors, the analyzing and control unit comprising:
        a position of center of gravity determination module configured to determine a current position of a center of gravity of the object together with the actuation element based on the detected sensor signals, and
        an actuation element position module configured to:
            determine an offset vector based on the determined current position of the center of gravity and independent of the current actual position of the actuation element with respect to the current position of the center of gravity, the offset vector representing an estimated instantaneous difference in position between the current position of the center of gravity and the current actual position of the actuation element, and
            calculate the current position of the actuation element based on the determined current position of the center of gravity and using the determined offset vector.

13. The position determination device according to claim 12, wherein:
    a space in front of the surface is sub-divided in sub-spaces,
    each sub-space is assigned a sub-space-specific offset vector, and
    the actuation element position calculation configured to determine the offset vector by selecting the sub-space-specific offset vector of the sub-space corresponding to the determined current position of the center of gravity.

14. The position determination device according to claim 12, wherein the actuation element position calculation module comprises an allocation module by means of which allocations of received signal strengths to determined distances of the actuation element to the respective sensor in each case are individually adaptable for the calculation of the current position of the actuation element depending on the determined current position of the center of gravity.

15. The position determination device according to claim 12, wherein in addition at least one position of the center of gravity determined beforehand during the approach is includible in the determination of the current position of the actuation elements.

16. The position determination device according to claim 12, wherein the surface is a touch-screen and the analyzing and control unit is designed to receive a contact position determined and provided by means of the touch-screen at a contact of the touch-screen by the actuation element and comprises a comparison module for determining a deviation of the contact position of the determined current position of the actuation element and a correction module to correct at least one of an offset and an allocation of the signal strengths to the distances.

17. The position determination device according to claim 16, comprising an identification module which can detect identification information of the user and stores in a memory in a personalized manner at least one of the offset and the allocation or reads these therefrom.

18. The position determination device according to claim 12, comprising a signaling device for generating a high frequency sensor signal, wherein the signaling device is arranged to couple the sensor signal capacitive or conductively into a body of the user; and the several sensors are designed to receive in a capacitive manner the sensor signal coupled into the body and transmitted via this body and the actuation element wherein the sensor signals of the sensors are a measure for the received signal strength.

19. The position determination device according to claim 12, wherein a further signaling device for generating a further high frequency (HF) signal is arranged such that a further HF Signal may be coupled into a further user and the sensors or further sensors are designed to provide further sensor signals which provide a measure for a received signal strength of the further HF signal transmitted via the further body and a further actuation element of the further user, and wherein by means of the further sensor signals a further current position of the center of gravity of the further object approaching together with the further actuation element is detectable and the further current position of the actuation element is detectable in consideration of the further current position of the center of gravity.

20. The position determination device according to claim 12, wherein the actuation element is a finger of a user.

21. The position determination device according to claim 12, wherein the object is a body part of a user.

22. The position determination device according to claim 12, wherein the actuation element position module is configured to calculate the current position of the actuation element by adding the offset vector to a value corresponding to the current center of gravity.

* * * * *

UNITED STATES PATENT AND TRADEMARK OFFICE
CERTIFICATE OF CORRECTION

PATENT NO. : 9,001,049 B2
APPLICATION NO. : 12/669586
DATED : April 7, 2015
INVENTOR(S) : Katharina Bachfischer et al.

It is certified that error appears in the above-identified patent and that said Letters Patent is hereby corrected as shown below:

In the Claims

Column 13,
Claim 2, line 42, "...received signal strength of the RF signal..." ---Change to--- "...received signal strength of the HF signal..."

Signed and Sealed this
Eighteenth Day of August, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 9,001,049 B2 | Page 1 of 1 |
| APPLICATION NO. | : 12/669586 | |
| DATED | : April 7, 2015 | |
| INVENTOR(S) | : Katharina Bachfischer et al. | |

It is certified that error appears in the above-identified patent and that said Letters Patent is hereby corrected as shown below:

<u>On the title page</u>
Item (75), Inventors, 1st inventor, "Katharina Bachfischer, Wolfsburg (DE)," should read "Katharina Bachfischer, Düsseldorf (DE)"

Signed and Sealed this
Twenty-ninth Day of December, 2015

Michelle K. Lee
*Director of the United States Patent and Trademark Office*